United States Patent
Fehr et al.

[15] 3,649,168
[45] *Mar. 14, 1972

[54] PROCESS FOR PRODUCING BASIC ZIRCONIUM SULFATE AND ZIRCONIA FROM SODIUM SILICOZIRCONATE

[72] Inventors: Bernard H. P. Fehr; Joseph Gascon, both of Thann, France

[73] Assignee: Fabriques De Produits Chimiques De Thann Et De Mulhouse, Thann (Haut Rhine), France

[ * ] Notice: The portion of the term of this patent subsequent to May 20, 1986, has been disclaimed.

[22] Filed: Sept. 5, 1968

[21] Appl. No.: 757,752

Related U.S. Application Data

[63] Continuation-in-part of Ser. No. 649,062, May 25, 1967, Pat. No. 3,445,199, which is a continuation-in-part of Ser. No. 381,149, July 8, 1964.

[30] Foreign Application Priority Data

Sept. 13, 1967 Great Britain......................41,862/67

[52] U.S. Cl..........................................23/18, 23/19, 23/22, 23/23, 23/24 Z, 23/117, 23/140
[51] Int. Cl. ......................................................C22b 59/00
[58] Field of Search......................23/19, 23, 24.1, 117, 140, 23/18, 22

[56] References Cited

UNITED STATES PATENTS

| 2,294,431 | 9/1942 | Wainer | 23/23 |
| 2,564,522 | 8/1951 | Rohden et al. | 23/24.1 |
| 3,168,374 | 2/1965 | Meyer-Simon et al. | 23/117 |

FOREIGN PATENTS OR APPLICATIONS

| 1,127,880 | 4/1962 | Germany | 23/140 |

*Primary Examiner*—Herbert T. Carter
*Attorney*—Albert C. Johnston, Robert E. Isnes, Lewis H. Eslinger and Alvin Sinderbrand

[57] ABSTRACT

Sodium silicozirconate is treated with dilute hydrochloric acid at a temperature of 20°–60° C., the concentration of the acid being subject to specified maxima (varying with temperature) to give a stable colloidal silica solution, and precipitating zirconium sulphate therefrom in a known way.

6 Claims, No Drawings

PROCESS FOR PRODUCING BASIC ZIRCONIUM SULFATE AND ZIRCONIA FROM SODIUM SILICOZIRCONATE

This is a continuation-in-part of copending application Ser. No. 649,062 filed May 25, 1967 now U.S. Pat. No. 3,445,199, which in turn is a continuation-in-part of application Ser. No. 381,149 filed July 8, 1964 now abandoned.

The invention relates to a process for the production of basic zirconium sulphate from a silicozirconate of an alkali metal.

Zirconium compounds are generally prepared from zirconium silicate sand, $ZrSiO_4$, which is the most common zirconium ore of suitable purity.

This zirconium silicate sand ore is usually sintered with sodium carbonate, the zirconium silicate being thus converted into sodium silicozirconate, which is easily attacked by acids.

This sintered mass or frit can be attacked by concentrated mineral acids, producing a substantially complete insolubilization of the silica and a solution from which the zirconium can be precipitated by addition of suitable reactants. This process is very costly on account of the considerable equipment which it requires and the large quantities of acids which are used, and has other disadvantages.

It has also been proposed to treat the sodium silicozirconate frit with mineral acids in order to obtain a suspension or pseudosolution, which is then treated to precipitate the zirconium oxide and to leave the silica in colloidal solution. The solubilization is for example effected with dilute sulphuric acid, and the precipitation by adding a potassium salt, causing precipitation of a double sulphate of zirconium and potassium.

It is also known to purify an impure zirconium oxide by precipitating a zirconium oxysulphate from a solution of zirconium containing sulphuric acid, hydrochloric acid and salts of alkali metals, the silica under certain conditions remaining in suspension.

These two latter processes are of limited use, because the colloidal solutions so obtained are difficultly stable, and as a consequence the elimination of the silica is difficult and sometimes even impossible.

In our British Spec. Pat. No. 1,060,223 we describe a process in which a sintered sodium silicozirconate mass is dissolved in the cold with a hydrochloric acid solution to form a stable colloidal solution, the zirconium is precipitated by moderate heating of the said solution in the presence of sulphate and fluoride ions, and the resulting basic zirconium sulphate precipitate is washed and collected.

The present invention consists in a modification of the above process in which the sintered sodium silicozirconate mass is treated with the hydrochloric acid at a temperature above 20° C. but not substantially exceeding 60° C., the concentration of the mass, reckoned as $ZrO_2$, in the acid being subject to a maximum which is obtainable from a curve based on the following figures:

| Temperature | Concentration |
|---|---|
| 20° C. | 100 $ZrO_2$ g./l. |
| 30° C. | 70 $ZrO_2$ g./l. |
| 40° C. | 40 $ZrO_2$ g./l. |
| 60° C. | 20 $ZrO_2$ g./l. |

Sulphate and fluoride ions are added to the resulting solution, heating is continued at a temperature up to 60° C., and the basic zirconium sulphate which precipitates is washed and collected. The residual solution contains colloidal silica, sodium chloride, and sodium sulphate.

Preferably the precipitate is washed by decantation and hydroextracted before it is collected.

The invention consists also in the zirconium compounds obtained by using this process.

Preferably the reaction is effected at a temperature of 25°–50 C. Although there is no critical lower limit to the concentration, it will usually be preferred to employ a concentration near to the upper limit specified for the temperature employed, for the sake of economy of reactor space.

While the reaction mixture may be positively heated, it is usually preferred simply to allow the temperature to rise. It is an advantage of this method of working that positive cooling will not normally be necessary.

The sintered sodium silicozirconate mass may be obtained in accordance with the standard practice. Care will be taken that its composition does not depart too much from the formula $ZrO_2 \cdot Na_2O \cdot SiO_2$, and that the zirconia is substantially completely acted on. The preparation of the corresponding potassium compound is known, but it is more expensive, and the sodium compound is therefore used in practice.

The sintered mass is preferably ground to dryness and then suspended in water.

The quantity of hydrochloric acid used is preferably 3 mol of HCl per mol of silicozirconate, plus an excess; a particularly preferred quantity is 3 to 31 mols of HCl per mol of silicozirconate. These operating conditions are based upon the following theoretical reaction:

$ZrO_2 \cdot Na_2O \cdot SiO_2 + 3 HCl \longrightarrow$

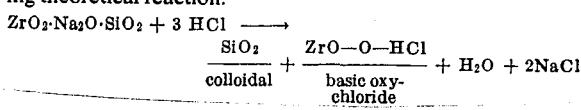

In industrial practice, an excess of at least 5 percent of hydrogen chloride, preferably of 5 to 40 percent or more, makes it possible to obtain a yield higher than 95 percent, and takes account of the residual free acidity of the suspension. The acid, which may already be in dilute form, is preferably added gradually to the stirred suspension, and the temperature allowed to rise to within the specified limits.

It is essential that the solution should take place in a medium of the specified concentration so as to avoid instability in the colloidal solution. The necessary water may be added in various ways, for example by adding ice during the treatment, or by diluting the suspension of sintered mass or acid employed.

When the addition of the acid is ended, the solution has a pH between 0.4 and 0.7, e.g., 0.5. An excessively low pH would impair the stability of the solution.

When equilibrium is established, the stirring is stopped and any solids present, such as unreacted ore, are eliminated by decantation.

It has been verified by dialysis that at this point the silica is substantially in the colloidal state and a high proportion of the zirconium is in ionic form.

The solution is thereafter preferably diluted to a content of 25–30 g. per liter of zirconium, reckoned as $ZrO_2$, whereafter sulphate ions are added in the molecular ratio $SO_3:ZrO_2 = 0.5:1$, preferably in the form of a solution of sodium sulphate or sulphuric acid or a mixture of sulphuric acid and sodium sulphate, in order to bring the pH of the solution to between 0.75 and 1.2. It is important to watch the pH at this point, since the right level is necessary for yields of basic sulphate above 90 percent, the basic sulphate being more soluble in proportion as the medium is more acid.

Fluorine ions are also added, either in the form of hydrofluoric acid or in the form of a soluble fluoride, since this has been found to promote a substantially quantitative yield of a precipitate free from silica. Further, the presence of fluorine ions makes it possible to use a lower temperature at the beginning of the precipitation, which otherwise takes place only above 45° C. The quantity to be added is at most 0.5 mol of HF (or equivalent fluoride) per gram atom of Zr in the solution, and is preferably from 6 to 8 percent by weight of $ZrO_2$.

The solution is gradually heated to 35°–45° C. (unless already at such temperature), but is not allowed to exceed 55° C., because this might result in at least partial gelling of the silica. The precipitation yields exceed 90 percent.

The precipitate can be washed with cold water by decantation. When calcined, it titrates about 99 percent of $ZrO_2+HfO_2$, the main impurities being $SiO_2$ (0.05 to 0.3 percent) and $Na_2O$ (0.1 to 0.4 percent), in accordance with the effectiveness of the washing.

Microscopic and X-ray examination show that it is an amorphous product. Its composition is in the neighborhood of $ZrO \cdot ZrO_2 \cdot SO_4 \cdot xH_2O$, and although it is not a definite compound, we have referred to it in this specification as basic zirconium sulphate, without formulating any theory as to its constitution.

It will be seen that, as compared with the previously described processes, its preparation is simple and economical, and does not require positive cooling during the solution operation; moreover less heat need be supplied to effect the precipitation than in the process of British Pat. No. 1,060,223.

Basic zirconium sulphate may be dissolved in sulphuric acid to form zirconium sulphate, or neutralized with ammonia and, after elimination of the sulphate ions, converted into various zirconium salts. It also gives on calcination an industrially pure zirconia.

The invention is illustrated by the following examples.

EXAMPLE 1

Four hundred kilograms of ground sintered sodium silicozirconate was suspended in water, and 470 l. of 34 percent aqueous hydrochloric acid was added, to give a final concentration of 40–45 g. $ZrO_2$ per liter, the total volume of liquid being about 5,000 l. The temperature was allowed to rise to 25°–30° C., and the reaction was continued for 6 hours with stirring. Under these conditions the silica was obtained as a stable colloidal solution.

Unreacted material was then separated by decantation, and the solution diluted to 25–30 g. $ZrO_2$ per liter. There were then added 250 kg. of sodium sulphate decahydrate and 18 l. of 70 percent hydrofluoric acid; the pH of the solution at this stage was 1.1.

The solution was then slowly heated by means of a steam injector to 45° C. over 2 hours. The basic zirconium sulphate formed was separated by decantation, and thereafter washed by two decantations each with 6 cubic meters of water, and separated by centrifuging.

On calcination a zirconia of composition:

|  | Percent |
| --- | --- |
| $ZrO_2$ (+$HfO_2$) | 99 |
| $SiO_2$ | 0.10–0.20 |
| $Fe_2O_3$ | 0.03 |
| $TiO_2$ | 0.10–0.15 |
| $Na_2O$ | 0.10–0.20 | was obtained.

EXAMPLE 2

Four hundred Kilograms of ground sintered sodium silicozirconate were suspended in 4,000 l. of water and 560 l. of 34 percent aqueous hydrochloric acid were added, and the concentration of $ZrO_2$ brought to 40–45 g./l. The mixture was stirred and the reaction continued for about 6 hours.

Unreacted material was then separated by decantation, and the solution diluted to 20–22 g. $ZrO_2$ per liter. There were then added 250 kg. of sodium sulphate decahydrate and 32 kg. of sodium fluoride. The solution is heated to 50° C. over 2 hours. The basic zirconium sulphate formed was separated by decantation, washed twice with water and then separated by centrifuging.

The product obtained was a white amorphous powder having the approximate formula $2ZrO_2 \cdot SO_3 \cdot nH_2O$ and a loss of weight on heating of 60–65 percent. On calcination at 950°–1,000° C. it gave a zirconia of the same composition as that of Example 1.

EXAMPLE 3

Example 2 was repeated except that 24 kg. of sodium fluosilicate was added instead of the 32 kg. of sodium fluoride.

We claim:

1. A process for the production of a basic zirconium sulphate substantially free of silica which comprises dissolving a sintered sodium silicozirconate mass by reacting it in dilute aqueous suspension with hydrochloric acid at a temperature above 20° C. but not substantially exceeding 60° C., the concentration of the sodium silicozirconate mass, reckoned at $ZrO_2$, in the acid being subject to a maximum which is obtainable from a curve based on the following figures:

| Temperature | Concentration (grams per liter) |
| --- | --- |
| 20° C. | 100 |
| 30° C. | 70 |
| 40° C. | 40 |
| 60° C. | 20 | thus forming a solution of its zirconium content which contains colloidal silica, reacting the zirconium content of said solution in dilute state, in the presence of fluoride ions, with sulphate ions in an amount sufficient to convert said content into an insoluble basic zirconium sulphate, precipitating said basic sulphate in the reaction solution by subjecting said solution to an elevated temperature not substantially exceeding 55° C. and settling out and separating the precipitate.

2. A process according to claim 1, wherein the mass is treated with the hydrochloric acid at 25°–50° C.

3. A process according to claim 1, wherein the solution obtained by the treatment with hydrochloric acid is diluted to a concentration of 25–30 g. per liter of zirconium reckoned as $ZrO_2$.

4. A process according to claim 1, wherein sulphate ions are added in a proportion of 0.5 mol, and fluoride ions in a proportion not exceeding 0.5 mol, per gram atom of zirconium.

5. A process according to claim 1, wherein the basic zirconium sulphate formed is subsequently calcined to form zirconia.

6. A process according to claim 1, wherein the insoluble basic zirconium sulphate is precipitated at a temperature of 35°–50 C.

* * * * *